Patented June 9, 1936

2,043,948

UNITED STATES PATENT OFFICE 2,043,948

PROCESS FOR MAKING HALOGEN-SUBSTITUTED THIAZOLES

Albert M. Clifford, Stow, Ohio, assignor to Wingfoot Corporation, Akron, Ohio, a corporation of Delaware No Drawing. Application November 6, 1933, Serial No. 696,837. In Canada June 22, 1931

10 Claims. (Cl. 260—44)

This invention relates to the synthesis of certain organic compounds; more particularly, to the synthesis of the halogen-substituted thiazoles. One of the objects of the invention is to provide a simple and economical method of manufacturing such halogen-substituted thiazoles as 1-chlor benzothiazole. Another object of the invention is to provide a convenient method of preparing halogen-substituted thiazoles in which the addition of solvents to the reacting materials is obviated.

Heretofore, in the manufacture of halogen-substituted thiazoles such, for example, as 1-chlor benzothiazole,

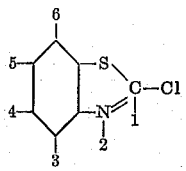

it has been customary to dissolve the desired mercapto thiazole in an inert solvent and subject the solution to treatment with the halogen, usually chlorine gas. This method manifestly is objectionable because considerable time and effort are required in removing the solvent from the reaction product. Also, of necessity, there is a material loss of relatively expensive solvent material during the course of the reaction and the subsequent purification of the product.

The present invention resides in the discovery of a method of preparing halogen-substituted thiazoles such as 1-chlor benzothiazole in which the addition of solvents to the reacting ingredients is made unnecessary and in which relatively high yields are obtained at slight expense. The invention is practiced by mixing a liquid sulphur halide with the desired thiazyl sulphide. When a free mercapto aryl thiazole is employed as the thiazyl sulphide, hydrogen halide fumes are evolved. Consequently, the materials should be mixed carefully and generally at room temperatures or lower. Although it is not necessary, it will usually be desirable in obtaining the most efficient results to heat the reaction mixture.

For convenience, the invention will be illustrated by the following examples, but it is to be understood that it is not limited thereto but extends to and includes other halogen-substituted thiazoles as well.

*Example 1*

In the preparation of 1-chlor benzothiazole, 1-mercaptobenzothiazole,

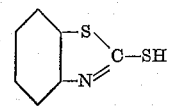

may be admixed with sulphur mono chloride and subjected to heat for a relatively short period of time. Mercaptobenzothiazole will be found to be appreciably soluble in sulphur chloride, reacting as it dissolves. The latter compound will be found to act as a chlorinating agent. The reaction effects a substitution of a chlorine atom for the —SH group attached to the thiazole nucleus. The reaction may be represented by the following equation:

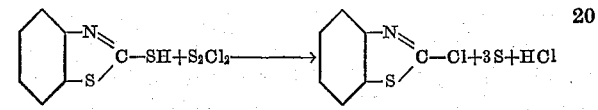

In carrying out the reaction, mercaptobenzothiazole and sulphur mono chloride ($S_2Cl_2$) are preferably intermixed in approximately molecular proportions, but with a slight excess of sulphur mono chloride; e. g., in the ratio of about 110 grams of mercaptobenzothiazole to about 100 grams of sulphur mono chloride.

This addition of one compound to the other should be made slowly in order to prevent the sudden evolution of an excessive quantity of hydrochloric acid, which tends to cause undue frothing of the mixture. After frothing has subsided, the mass is subjected to heat sufficient to cause incipient boiling for a period of approximately one hour. During this period, most of the hydrochloric acid escapes from the mixture. However, a small quantity remains in the solution in combination with the chlor benzothiazole, with which it unites to form a relatively easily decomposed addition product.

The 1-chlor benzothiazole thus produced may be separated from the reaction mixture by distillation. Preferably the latter step is conducted at atmospheric pressures until the boiling point of the mixture rises to a temperature of approximately 150 degrees C. When this point has been reached, the solution is subjected to distillation in vacuo, the distillation being continued so long as a relatively clear distillate is given off. During the process of distilling off the chlor benzothiazole, it is desirable to blow a small amount of air or steam through the liquid in order to break up any addition product of the chlor benzothiazole and hydrochloric acid which may be present and thus to void the apparatus of hydrochloric acid.

During the distillation, care should be taken to prevent the deposition of crystals of the reaction product of hydrochloric acid and chlor benzothiazole in the passage of the condenser. Deposition of the crystals sometimes takes place as a result of contact of hydrochloric acid gas with chlor benzothiazole vapors against the condenser walls. The 1-chlor benzothiazole thus obtained has a boiling point of 160–165 degrees C. under a pressure of 65–70 mm. of mercury. The product, when pure, is a substantially colorless liquid of relatively high specific gravity. The ordinary commercial product is of pale yellow color due to the presence of slight impurities contained therein.

*Example 2*

To 15 grams of 1-mercapto naphtho thiazole are added 10.2 grams of technical sulphur dichloride, $SCl_2$. The mixture is warmed gently until most of the hydrochloric acid gas which forms during the reaction has evolved. The reaction mixture is then submitted to distillation under reduced pressure. The distillate crystallizes when cooled. A yield of approximately 9 grams of 1-chlor naphthothiazole, melting at 77–78 degrees C., is obtained. The reaction probably proceeds as follows:

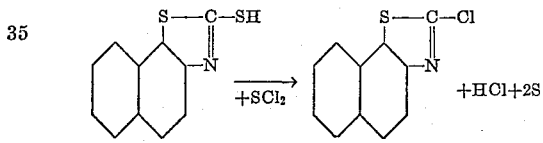

*Example 3*

Dibenzothiazyl disulphide and sulphur dichloride, $SCl_2$, are mixed in the proportion of 33.2 grams of the former to 27 grams of the latter. The mixture is gradually warmed and then refluxed for a period of approximately 2 hours. In this case, no foaming or frothing occurs because of the fact that no hydrochloric acid gas is formed. The mixture is then subjected to distillation and the fraction boiling between 245–260 degrees C. is collected. The product 1-chlor benzothiazole, is obtained in an almost quantitative yield of 32 grams. The equation representing the reaction is believed to be as follows:

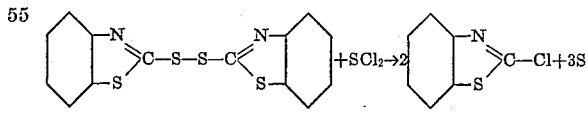

Similar results are obtained with sulphur mono chloride or any other liquid sulphur halide.

*Example 4*

What is believed to be essentially sulphur mono bromide, $S_2Br_2$, is prepared by adding 40 grams of bromine to 16 grams of sulphur. The mixture becomes warm and forms a red heavy liquid. To this liquid are added gradually 45 grams of 1-mercaptobenzothiazole. As the mixture is heated gently, a vigorous evolution of hydrobromic acid fumes takes place. After this evolution of gas subsides, the residue is subjected to distillation under reduced pressure. An orange-red solid which sublimes at 190–240 degrees C. under a pressure of 60–80 mm. of mercury is obtained. It is believed to be the hydrobromic acid addition compound of 1-brom benzothiazole. This product looses hydrobromic acid on exposure to air containing moisture or on treatment with water, giving a heavy yellow oil.

*Example 5*

Approximately equimolecular proportions of 1-mercaptobenzothiazole and sulphur mono chloride, $S_2Cl_2$, are mixed at room temperature and allowed to stand for a period of four hours or more. The reaction is exothermic, the temperature rising to perhaps 50–60 degrees C. The 1-mercaptobenzothiazole goes into solution, forming the 1-chlor benzothiazole. The reaction taking place is thought to be the same as that given in Example 1.

From the foregoing examples it is apparent that the process constituting the subject matter of this invention is quite simple and does not necessitate the use of inert solvents ordinarily required in manufacturing 1-halogen-substituted thiazoles. By careful observance of the reacting conditions, almost quantitative yields may be obtained. While the addition of heat other than that normally given off in the reaction itself is not necessary for the most efficient results, it will usually be found desirable to heat the materials during reaction. When the thiazyl sulphide is employed in the form of the free 1-mercapto-thiazole, care should be taken to prevent a too violent evolution of gaseous hydrogen halide. While only sulphur mono chloride, sulphur dichloride and sulphur mono bromide have been mentioned by way of example, it will be understood that other sulphur halides liquid at normal temperatures such as sulphur dibromide and sulphur tetra chloride, may be employed in lieu thereof in the practice of the invention.

It is of course to be understood that the invention is not limited to the manufacture of the particular halogen-substituted thiazoles previously disclosed. Examples of other thiazyl sulphides than 1-mercaptobenzothiazole and 1-mercapto naphtho thiazole which may be employed in the practice of the invention are the 1-mercapto tolyl thiazoles; the 1-mercapto xylyl thiazoles; 1-mercapto 5-ethoxy benzothiazole; 1-mercapto 3-methoxy benzothiazole; 1-mercapto 3-phenyl benzothiazole; 1-mercapto 4-nitro benzothiazole; 1-mercapto 5-nitro benzothiazole; 1-mercapto 4-chlor benzothiazole; 1-mercapto 5-chlor benzothiazole; 1-mercapto 4-chlor 5-nitro benzothiazole, and other 1-mercapto substituted benzo- and naphthothiazoles. In place of the dibenzothiazyl disulphide given in Example 3 may be employed 5-5' dinitro dibenzothiazyl disulphide; 5-5' dichlor dibenzothiazyl disulphide; 4-4' dinitro dibenzothiazyl disulphide; 4-4' dichlor dibenzothiazyl disulphide; the ditolyl thiazyl disulphides; the dixylyl thiazyl disulphides; dinaphthothiazyl disulphide; 3-3' dimethoxy dibenzothiazyl disulphide, etc.

Although only the preferred forms of the invention have been described in detail, it will be apparent to those skilled in the art that the invention is not limited thereto, but that various modifications may be made therein without departing from the spirit of the invention or from the scope of the appended claims.

This application is in part a continuation of application Serial 496,821, filed November 19, 1930.

It is intended that the patent shall cover, by suitable expression in the appended claims, whatever features of patentable novelty reside in the invention.

What I claim is:

1. The method of manufacturing 1-chlor benzothiazole which comprises heating 1-mercaptobenzothiazole in the absence of extraneous solvents with sulphur mono chloride.

2. The method of manufacturing 1-chlorbenzothiazole which comprises subjecting 1-mercaptobenzothiazole to the action of a binary sulphur chloride in the absence of extraneous solvents.

3. The method of preparing a 1-chlor aryl thiazole which comprises reacting a 1-mercapto aryl thiazole of the benzene and naphthalene series in the absence of extraneous solvents with a binary sulphur chloride.

4. The method of preparing a 1-chlor benzothiazole which comprises reacting a 1-mercaptobenzothiazole in the absence of extraneous solvents with a binary sulphur chloride.

5. The method of preparing a 1-halogen benzothiazole which comprises reacting a 1-mercaptobenzothiazole in the absence of extraneous solvents with a liquid sulphur mono halide.

6. The process which comprises reacting upon a thiazyl 1-sulphide of the benzene and naphthalene series in the absence of extraneous solvents with a binary sulphur halide.

7. The process which comprises reacting upon a thiazyl 1-sulphide of the benzene and naphthalene series in the absence of extraneous solvents with a binary sulphur chloride.

8. The process which comprises reacting upon a thiazyl 1-sulphide of the benzene and naphthalene series in the absence of extraneous solvents with sulphur dichloride.

9. The process which comprises reacting upon a compound selected from the group consisting of the 1-mercaptobenzothiazoles, the 1-mercapto naphthothiazoles, the dibenzothiazyl 1-1' disulphides and the dinaphthothiazyl 1-1' disulphides in the absence of extraneous solvents with a binary sulphur halide.

10. The process which comprises reacting upon a compound selected from the group consisting of the 1-mercaptobenzothiazoles, the 1-mercapto napthothiazoles, the dibenzothiazyl 1-1' disulphides and the dinaphthothiazyl 1-1' disulphides in the absence of extraneous solvents with a binary sulphur chloride.

ALBERT M. CLIFFORD.